(12) United States Patent
Arai et al.

(10) Patent No.: US 11,415,549 B2
(45) Date of Patent: Aug. 16, 2022

(54) EDDY CURRENT FLAW DETECTION DEVICE

(71) Applicant: HITACHI ZOSEN CORPORATION, Osaka (JP)

(72) Inventors: Hiroaki Arai, Osaka (JP); Akihiro Shin, Osaka (JP); Takaaki Yamada, Fukuoka (JP); Hiroshi Azuma, Fukuoka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 16/650,867

(22) PCT Filed: May 21, 2018

(86) PCT No.: PCT/JP2018/019512
§ 371 (c)(1),
(2) Date: Mar. 26, 2020

(87) PCT Pub. No.: WO2019/064685
PCT Pub. Date: Apr. 4, 2019

(65) Prior Publication Data
US 2020/0278321 A1    Sep. 3, 2020

(30) Foreign Application Priority Data
Sep. 27, 2017  (JP) ............... JP2017-185535

(51) Int. Cl.
*G01N 27/9013*   (2021.01)
*G01N 27/90*     (2021.01)

(52) U.S. Cl.
CPC ....... *G01N 27/902* (2013.01); *G01N 27/9046* (2013.01)

(58) Field of Classification Search
None
See application file for complete search history.

(56) References Cited

U.S. PATENT DOCUMENTS 4,814,705 A * 3/1989 Saunderson ........... G01N 27/82
                                                   324/225
5,130,652 A   7/1992 Kawakami et al.
(Continued)

FOREIGN PATENT DOCUMENTS

JP   S61132747   8/1986
JP   H02147950   6/1990
(Continued)

OTHER PUBLICATIONS

"International Search Report (Form PCT/ISA/210) of PCT/JP2018/019512," dated Jul. 17, 2018, with English translation thereof, pp. 1-4.

*Primary Examiner* — Nasima Monsur
(74) *Attorney, Agent, or Firm* — JCIPRNET (57) ABSTRACT

The present invention provides an eddy current flaw detection device capable of applying a sufficiently strong magnetic field to a test object without using a significantly large magnet. A magnetic-field forming magnet 60 includes a base magnet piece 60a and a tip magnet piece 60b. The tip magnet piece 60b has a tip pole face 62 from which a magnetic pole is directed toward a test object 30. The tip pole face 62 has a smaller area than a base face 64 of the base magnet piece 60a, the base face 64 being located on the opposite side of the magnetic-field forming magnet 60 from the tip pole face 62.

6 Claims, 5 Drawing Sheets

(56) References Cited

U.S. PATENT DOCUMENTS

| | | | |
|---|---|---|---|
| 5,414,353 A | 5/1995 | Weischedel | |
| 5,565,773 A | 10/1996 | Naguma et al. | |
| 6,967,478 B2 * | 11/2005 | Wayman | G01N 27/82 |
| | | | 324/235 |
| 2010/0148766 A1 | 6/2010 | Weischedel | |
| 2012/0153944 A1 * | 6/2012 | Tada | G01N 27/9006 |
| | | | 324/239 |
| 2013/0076349 A1 * | 3/2013 | Kurokawa | G01N 27/90 |
| | | | 324/240 |
| 2013/0127452 A1 * | 5/2013 | Boenisch | G01N 27/9006 |
| | | | 324/242 |
| 2018/0217097 A1 | 8/2018 | Tada et al. | |

FOREIGN PATENT DOCUMENTS

| | | |
|---|---|---|
| JP | H06331602 | 12/1994 |
| JP | H07174730 | 7/1995 |
| JP | 2011047736 | 3/2011 |
| JP | 4885068 | 2/2012 |
| JP | 2017026354 | 2/2017 |

* cited by examiner

EDDY CURRENT FLAW DETECTION DEVICE

CROSS-REFERENCE TO RELATED APPLICATION

This application is a 371 application of the International PCT application serial no. PCT/JP2018/019512, filed on May 21, 2018, which claims the priority benefit of Japan Patent Application No. 2017-185535, filed on Sep. 27, 2017. The entirety of each of the abovementioned patent applications is hereby incorporated by reference herein and made a part of this specification.

TECHNICAL FIELD

The present invention relates to an eddy current flaw detection device and particularly relates to an eddy current flaw detection device using a magnetic saturation method.

BACKGROUND ART

Conventionally, an eddy current flaw detection device described in Patent Literature 1 is used as a flaw detection device for inspecting the presence or absence of a flaw (defect) on the surface of a structure (a subject, a test object) made of a conductive material. The device generates eddy current on a test object and detects the intensity of the eddy current and the change of the shape of eddy current flow, thereby inspecting the presence or absence of a flaw on the test object. If the test object has a flaw, the device can also determine the position, shape, and depth of the flaw.

The inventors examined the case where a plurality of regions have different magnetic permeabilities (heterogeneous magnetic permeability) on the surface of the test object. For example, if the test object is made of a non-ferromagnetic base material and is partially welded, the surface of the test object is basically non-ferromagnetic but a part around a welded point of the test object is magnetized with an uneven magnetic field. In the case where ferromagnetic and non-ferromagnetic regions are mixed on the surface, an inspection conducted by a flaw detection device across the regions may cause noise in an inspection result because of a change in magnetic permeability between the regions. As a solution to the problem of noise, a method of magnetic saturation (magnetic saturation method) is available. In this method, a strong and uniform magnetic field is applied to a test object so as to cancel out an uneven magnetic field generated in an inspection region. The test object is brought into magnetic saturation, that is, a difference in magnetic permeabilities between a ferromagnetic material and a non-ferromagnetic material is substantially eliminated. In the state of magnetic saturation, noise caused by an heterogeneous magnetic permeability on the surface of the test object is considerably reduced. Thus, this method can detect a flaw of the test object even if the surface of the test object has an area containing a ferromagnetic material with an uneven magnetic field.

CITATION LIST

Patent Literature

Japanese Patent No. 4885068 is referred to as "Patent Literature 1" in this specification.

SUMMARY OF INVENTION

Technical Problem

A strong magnetic field is necessary for magnetic saturation of the test object. However, magnets capable of forming strong magnetic fields tend to have large dimensions. For example, an electromagnet can form a strong magnetic field with a large current but windings and electric wires that are resistant to such a large current tend to have large dimensions. Hence, if an electromagnet used with a large current is provided for an eddy current flaw detection device, the eddy current flaw detection device is also upsized. Since an eddy current flaw detection device is expected to detect a relatively small flaw (typically, 3 mm or less in depth and width), upsizing of the detection device makes it difficult to detect a small flaw. Moreover, a large magnet increases the weight of the overall eddy current flaw detection device. It is difficult to move a heavy eddy current flaw detection device on the surface of a test object. A permanent magnet can be designed in a small size but small magnets are typically unable to obtain a sufficiently strong magnetic field.

An object of the present invention is to provide an eddy current flaw detection device capable of applying a sufficiently strong magnetic field to a test object even if a magnetic-field forming magnet is not so large in size.

Solution to Problem

An eddy current flaw detection device according to an aspect of the present invention generates eddy current on a test object and inspects a state of a surface of the test object by detecting a change of the eddy current, the eddy current flaw detection device including: a detection part for detecting a change of the eddy current; and a magnetic-field forming magnet that is disposed outside the detection part and applies a magnetic field to the test object, wherein the magnetic-field forming magnet includes a first magnet piece and a second magnet piece more remote from the test object than the first magnet piece, and the first magnet piece has an end face near the test object such that the end face has a smaller area than at least one of the end faces of the second magnet piece, the second magnet piece having one of the end faces near the test object and the other end face on the opposite side of the second magnet piece.

It is preferable that if two intersecting directions in the end face of the first magnet piece near the test object are a width direction and a depth direction, the end face of the second magnet piece near the test object has larger dimensions in the width direction and the depth direction than the end face of the first magnet piece near the test object in the width direction and the depth direction.

It is preferable that the test object is made of austenitic stainless steel, the test object has an outer surface including a welded part of austenitic stainless steel, and the eddy current flaw detection device generates eddy current on the welded part and inspects the presence or absence of a flaw on the welded part by detecting a change of the eddy current.

Advantageous Effects of Invention

The present invention can provide an eddy current flaw detection device capable of applying a sufficiently strong magnetic field to a test object even if a magnetic-field forming magnet is not so large in size.

DESCRIPTION OF EMBODIMENT

Figure 1:
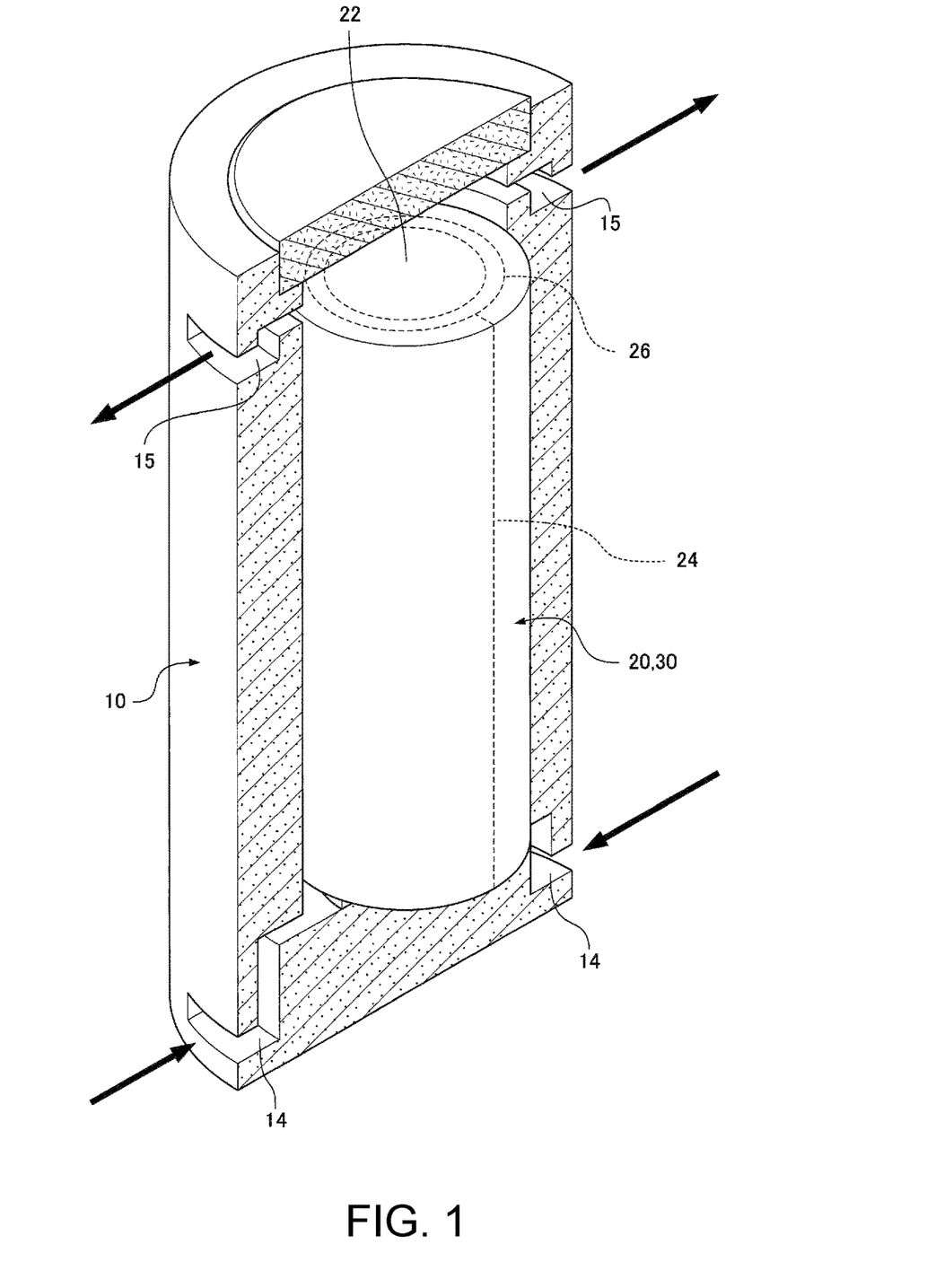
FIG. 1 illustrates a canister to be inspected by an eddy current flaw detection device according to an example of an embodiment of the present invention.

FIG. 1 illustrates a canister 20 (test object) on which a flaw inspection (detection) is conducted by an eddy current flaw detection device according to an example of an embodiment of the present invention. The canister 20 is a metallic cylindrical container that contains spent nuclear fuel. As illustrated in FIG. 1, the canister 20 is stored in a region remote from an urban area, typically in a coastal region while being contained in a large concrete container (concrete cask 10).

In the lower part of the concrete cask 10, an air inlet 14 is provided so as to radially penetrate the concrete cask 10, whereas in the upper part of the concrete cask 10, an air outlet 15 is provided so as to radially penetrate the concrete cask 10. The canister 20 is heated by decay heat from the spent nuclear fuel contained in the canister 20. In the meantime, outside air is drawn from the air inlet 14 and air is discharged from the air outlet 15. In this process, outside air comes into contact with the side of the canister 20, thereby cooling the canister 20.

If the concrete cask 10 is stored in a coastal region, air in the coastal region contains sea salt and thus chloride may rust or corrode the surface of the canister 20 in contact with outside air. Moreover, if a tensile stress is applied to a rusted or corroded point, stress corrosion cracking (SCC) may occur at the point. Thus, the canister 20 is regularly removed from the concrete cask 10 and the presence or absence of SCC is inspected (detected) on the surface of the canister 20.

As illustrated in FIG. 1, the canister 20 includes a cylindrical body with a bottom and a lid 22 closing an opening at the top of the body. The body of the canister 20 and the lid 22 are fixed to each other by welding. As illustrated in FIG. 1, the mark of welding is left as a lid welded part 26. The side of the body of the canister 20 is formed by bending a rectangular metal plate into a cylindrical shape and welding both ends of the metal plate. The mark of welding is also left as a side welded part 24 as illustrated in FIG. 1. The side welded part 24 and the lid welded part 26 are susceptible to a tensile stress and thus SCC is highly likely to occur in the parts. Thus, flaw detection is important particularly on the side welded part 24 and the lid welded part 26.

Figure 2:
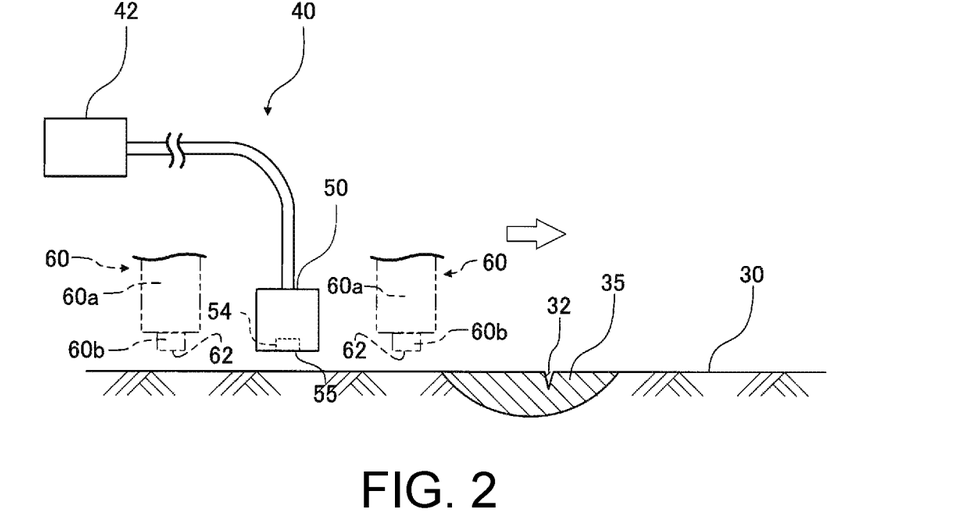
FIG. 2 schematically illustrates an example of the structure of an inspection probe.

FIG. 2 schematically illustrates a state of flaw detection using an eddy current flaw detection device 40. The eddy current flaw detection device 40 includes an inspection probe 50. An alternating magnetic field is generated from the inspection probe 50. When an alternating magnetic field approaches the surface of a test object 30 (e.g., the side wall, lid, and bottom of the canister 20), an eddy current is generated on a metal (typically, austenitic stainless steel in the canister 20) constituting the outer surface of the test object 30. Magnetic flux produced from the eddy current is detected by the inspection probe 50 and a state of the surface of the test object 30 is determined based on a detected magnetic flux density and a waveform.

FIG. 2 schematically illustrates an example of the structure of the eddy current flaw detection device 40. The eddy current flaw detection device 40 includes the inspection probe 50 and a controller 42. The inspection probe 50 includes a detection part 54 for detecting a change of eddy current generated on the surface of the test object 30. The controller 42 has the function of processing a detection signal received from the inspection probe 50.

In this configuration, the lower end face of the detection part 54 is opposed to the surface of the test object 30. The lower end face serves as a detection surface 55 of the inspection probe 50 that receives magnetic flux from eddy current generated on the test object 30.

In this case, the reaction of the surface of the test object 30 with an alternating magnetic field varies depending upon the property of the material of the test object 30. If the material has a uniform property in an inspection range, the eddy current flaw detection device 40 can conduct flaw detection by searching for a part that reacts with an alternating magnetic field in a different manner from other parts. However, if the property of the material, particularly the magnetic permeability of the material varies among positions, a reaction with an alternating magnetic field varies among positions in the absence of a flaw 32. Thus, noise is generated so as to affect an inspection, leading to difficulty in flaw detection. Therefore, it is desirable to remove noise as much as possible.

Figure 3:
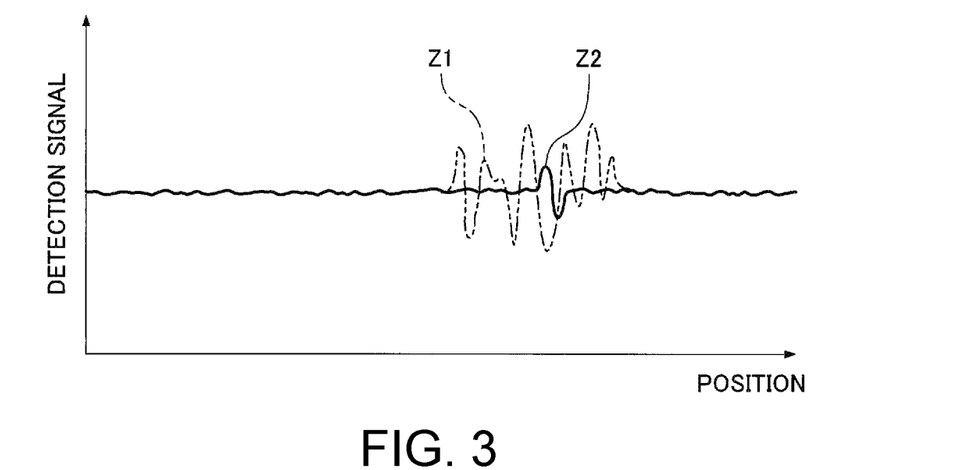
FIG. 3 indicates a detection signal including noise and a detection signal from which noise is removed.

In FIG. 2, a dissimilar material part 35 that is made of a different material having a different magnetic permeability from an adjacent area appears on a part of the surface of the test object 30. For example, if the test object 30 is the canister 20 illustrated in FIG. 1, a dissimilar material may appear on the side welded part 24 and the lid welded part 26 (welded part). Specifically, if the canister 20 is made of austenitic stainless steel, a ferrite alloy may appear on the welded part. In other words, when austenitic stainless steel is melted in the process of welding, the atomic arrangement of iron (Fe), chromium (Cr), nickel (Ni), molybdenum (Mo), and carbon (C) that constitute the steel is disturbed and thus an alloy having a different atomic arrangement from austenitic stainless steel may appear on the surface of the test object after the completion of welding. In some cases, a ferrite alloy may appear. FIG. 3 indicates a state where noise appears on the detection signal and a state where noise is removed using a magnetic-field forming magnet 60 when the surface of the test object 30 has a heterogeneous magnetic permeability.

The direction of a magnetic field is disturbed at a position where a ferrite alloy is present. Thus, even if the surface has no flaw 32, the detection signal detected by the inspection probe 50 is changed at a position where a ferrite alloy is present. For this reason, in the welded part on which a ferrite alloy appears, it is difficult to determine whether the detection signal is changed by a flaw 32 or a ferrite alloy.

Specifically, as illustrated in FIG. 2, if a ferrite alloy appears on the surface of the test object 30 and forms the dissimilar material part 35, the magnetic flux of an alternating magnetic field generated from the inspection probe 50 is disturbed at the position of the dissimilar material part 35. When the inspection probe 50 passes over the position, noise occurs on the detection signal (a graph Z1 in FIG. 3). Thus, even if the dissimilar material part 35 has the flaw 32, it is difficult to detect a change caused by the flaw 32 on the detection signal.

As indicated by virtual lines in FIG. 2, the magnetic-field forming magnet 60 is disposed outside the inspection probe 50, so that the magnetic permeabilities of the test object 30 and the dissimilar material part 35 are changed when a magnetic field is received from the magnetic-field forming magnet 60. By properly setting the intensity of a magnetic field of the magnetic-field forming magnet 60, the test object 30 and the dissimilar material part 35 have substantially equal magnetic permeabilities. Thus, a reaction with an alternating magnetic field from the inspection probe 50 is substantially the same in the dissimilar material part 35 and other parts, so that the detection signal is intensified only at the position of the flaw 32 (a graph Z2 in FIG. 3).

Figure 4:
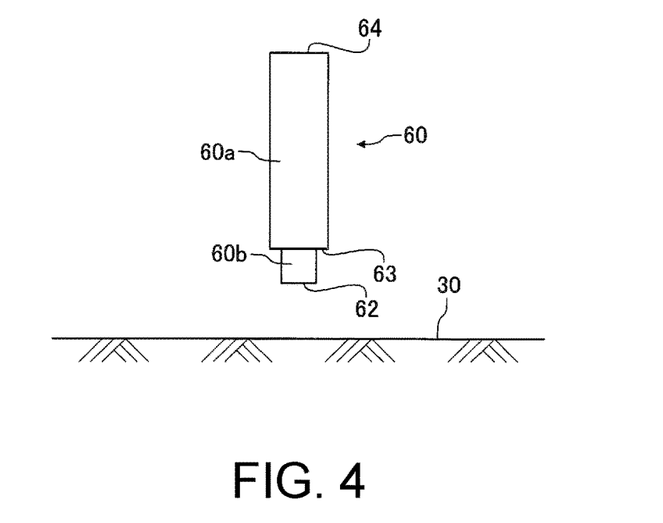
FIG. 4 illustrates the structure of a magnetic-field forming magnet.

As illustrated in FIGS. 2 and 4, the magnetic-field forming magnet 60 in the present embodiment includes a base magnet piece 60a (second magnet piece) and a tip magnet piece 60b (first magnet piece). The tip magnet piece 60b is mounted on one face (mounting face 63) of the base magnet piece 60a so as to face the test object 30. Thus, as illustrated in FIG. 4, the tip magnet piece 60b is disposed near the test object 30, whereas the base magnet piece 60a is located more remotely from the test object 30 than the tip magnet piece 60b. The tip magnet piece 60b has a tip pole face 62 (one end face of the first magnet piece near the test object) directed to the test object 30. One of the magnetic poles of the overall magnetic-field forming magnet 60 appears on the tip pole face 62.

The base magnet piece 60a has a base face 64 (one end face of the second magnet piece on the opposite side from the other end face near the test object) on the opposite side of the overall magnetic-field forming magnet 60 from the tip pole face 62. If the base magnet piece 60a is a rod-shaped magnet piece as illustrated in FIG. 4, a mounting face 63 serves as one end of the base magnet piece 60a (one end face of the second magnet piece near the test object) and the base face 64 serves as the other end of the base magnet piece 60a. As illustrated in FIG. 4, the tip pole face 62 of the tip magnet piece 60b has a smaller area than the mounting face 63 and the base face 64 of the base magnet piece 60a (one end face near the test object and the other end face on the opposite side).

The base magnet piece 60a and the tip magnet piece 60b are combined in the aforementioned manner, so that the overall magnetic-field forming magnet 60 tapers down toward the test object 30. Magnetic flux concentrates on the tapering portion, that is, the tip pole face 62 having a small area, thereby increasing a magnetic flux density near the tip pole face 62. For example, in the case of a shape illustrated in FIG. 4, one of the magnetic poles of the overall magnetic-field forming magnet 60 appears on the tip pole face 62 and the other magnetic pole appears on the base face 64. A magnetic pole passing through one of the magnetic poles needs to pass through the other magnetic pole, so that a large amount of magnetic flux passing through the base face 64 having a large area mostly passes through the tip pole face 62 having a small area and the large amount of magnetic flux concentrates on the tip pole face 62. Thus, the surface magnetic-flux density of the tip pole face 62 is higher than that of the base face 64.

The tip pole face 62 serving as the magnetic pole of the overall magnetic-field forming magnet 60 has a higher surface magnetic-flux density than the base magnet piece 60a or the tip magnet piece 60b (not combined with each other). For example, it is assumed that each of the base magnet piece 60a and the tip magnet piece 60b has a surface magnetic-flux density of 500 mT. In the combination as in FIG. 4, even if the base face 64 is kept at a surface magnetic-flux density of 500 mT, the tip pole face 62 has a high surface magnetic-flux density of 550 mT.

Figure 9:
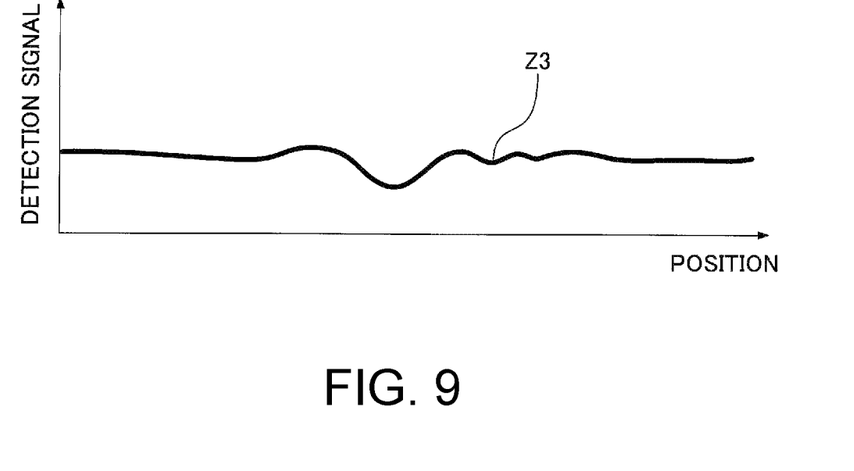
FIG. 9 is a graph of a detection signal including noise.
Figure 10:
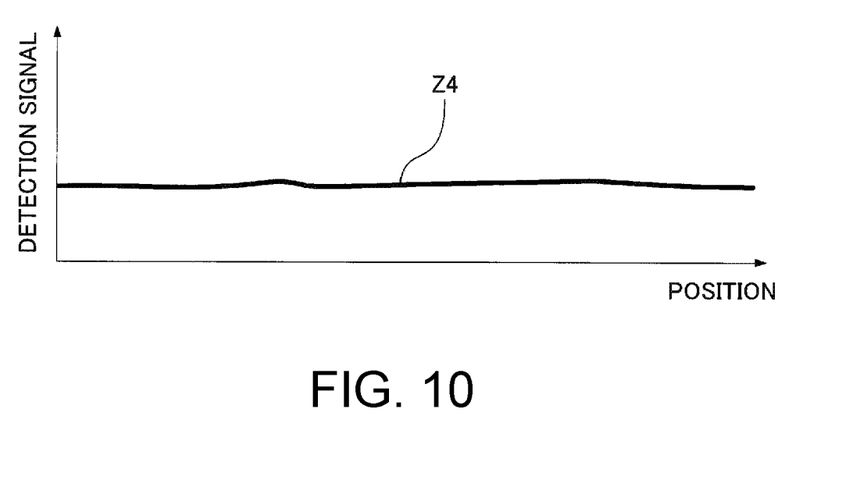
FIG. 10 is a graph of a detection signal from which noise is removed.

Referring to FIGS. 9 and 10, noise is sufficiently removed by using the magnetic-field forming magnet 60 that is a combination of the base magnet piece 60a and the tip magnet piece 60b as illustrated in FIG. 4. Graphs in FIGS. 9 and 10 indicate the detection signal in the detection of the eddy current flaw detection device 40 on the welded part (the side welded part 24 or the lid welded part 26) of the canister 20 in FIG. 1. In this case, the surface of a welded specimen of austenitic stainless steel used as a material of the canister 20 was inspected instead of the canister 20 itself, and then the obtained detection signal was examined. Specifically, specimens of SUS316 were TIG welded together and then the welded part was inspected. Graphs indicate the detection signal obtained when the surface is unflawed.

In FIGS. 9 and 10, the test object was inspected under the same conditions. Graph Z3 in FIG. 9 shows the detection signal obtained when the magnetic-field forming magnet 60 only includes the base magnet piece 60a. As indicated by a graph Z3, even if the surface of the specimen is not flawed, many fluctuations appear and noise occurs in the detection signal due to the influence of a dissimilar metal (e.g., a ferrite alloy) appearing on the welded part. The noise is not sufficiently removed only by the base magnet piece 60a.

Graph Z4 in FIG. 10 shows the detection signal obtained when the magnetic-field forming magnet 60 is a combination of the base magnet piece 60a and the tip magnet piece 60b as illustrated in FIG. 4. Graph Z4 in FIG. 10 is obviously flatter than graph Z3 in FIG. 9, proving that noise is sufficiently removed by the combination of the base magnet piece 60a and the tip magnet piece 60b.

As has been discussed, in the present embodiment, the magnetic-field forming magnet 60 is a combination of multiple magnet pieces (the base magnet piece 60a, the tip magnet piece 60b) and thus a sufficiently high magnetic flux density can be obtained over the magnetic-field forming magnet 60 so as to sufficiently remove noise from the detection signal, though each of the magnet pieces does not generate a large magnetic force. The magnet pieces that do not generate large magnetic forces are not so large in size, so that the overall magnetic-field forming magnet 60 are not extremely increased in size. Thus, the eddy current flaw detection device 40 including the magnetic-field forming magnet 60 is suitable for detecting small flaws. Moreover, the eddy current flaw detection device 40 is not heavy and thus is easily moved on the surface of the test object 30.

According to the present embodiment, the magnet pieces shaped like rectangular solids (blocks) having different dimensions are combined as illustrated in FIG. 4, so that the overall magnetic-field forming magnet 60 tapers down. Hence, even if the base magnet piece 60a and the tip magnet piece 60b are made of materials that are hard to machine, for example, a samarium-cobalt magnet, it is not necessary to machine the magnet pieces into complicated shapes. Blocktype magnetic pieces with relatively high machinability may be prepared. Thus, the magnetic-field forming magnet 60 can be easily fabricated.

Figure 5:
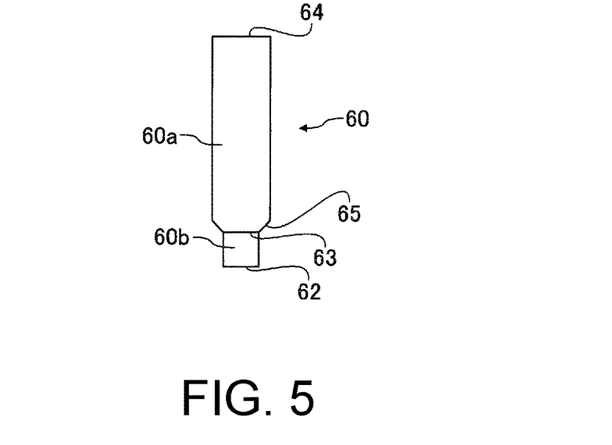
FIG. 5 illustrates a tilted portion at the distal end of a base magnet piece.

In the present embodiment, as illustrated in FIG. 4, the base magnet piece 60a is a rod-shaped magnet piece having an outside shape like a rectangular solid. In FIG. 4, the mounting face 63 of the base magnet piece 60a is larger than the upper side of the tip magnet piece 60b. The shapes of the base magnet piece 60a and the tip magnet piece 60b are not particularly limited. If the base magnet piece 60a is made of materials having high machinability, for example, a tilted portion 65 tapering toward the tip may be provided on one end of the longitudinal direction of the base magnet piece 60a as illustrated in FIG. 5. The base magnet piece 60a is shaped such that the tilted portion 65 and the mounting face 63 have a trapezoidal outside shape as illustrated in FIG. 5. In this case, the mounting face 63 and the upper side of the tip magnet piece 60b can be identical in size in FIG. 5. Moreover, if the tip magnet piece 60b is shaped like a rectangular solid, the mounting face 63 and the tip pole face 62 are identical in size.

Figure 6:
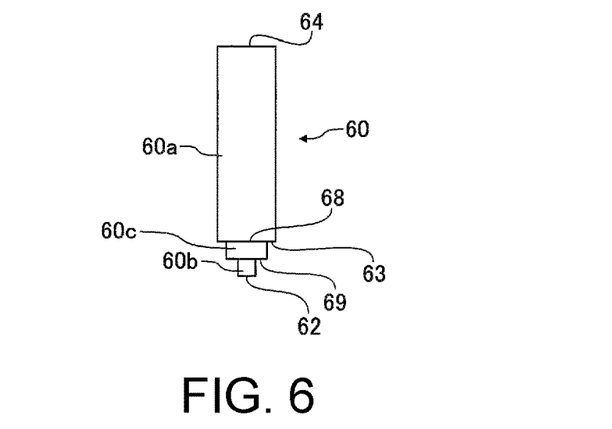
FIG. 6 illustrates an intermediate magnet piece disposed between a tip magnet piece and a base magnet piece.

As illustrated in FIG. 4, the magnetic-field forming magnet 60 in the present embodiment includes the base magnet piece 60a and the tip magnet piece 60b. The magnetic-field forming magnet 60 may include three or more magnet pieces. For example, as illustrated in FIG. 6, an intermediate magnet piece 60c may be disposed between the base magnet piece 60a and the tip magnet piece 60b. In this case, the base magnet piece 60a, the intermediate magnet piece 60c, and the tip magnet piece 60b desirably decrease in size in this order such that the overall magnetic-field forming magnet 60 tapers down. In FIG. 6, the intermediate magnet piece 60c has a face 68 (the upper side in FIG. 6) adjacent to the base magnet piece 60a such that the face 68 is smaller than the base face 64 and the mounting face 63 of the base magnet piece 60a. The intermediate magnet piece 60c has a face 69 (the lower side in FIG. 6) adjacent to the tip magnet piece 60b such that the face 69 has a larger area than the tip pole face 62. The magnetic-field forming magnet 60 including the three magnet pieces has a higher surface magnetic-flux density on the tip pole face 62 than in the case where the magnetic-field forming magnet 60 includes two magnet pieces. For example, if each of the base magnet piece 60a, the intermediate magnet piece 60c, and the tip magnet piece 60b in FIG. 6 has a surface magnetic-flux density of 500 mT, the combination of the magnet pieces in FIG. 6 can obtain a high surface magnetic-flux density of 600 mT on the tip pole face 62.

Figure 7:
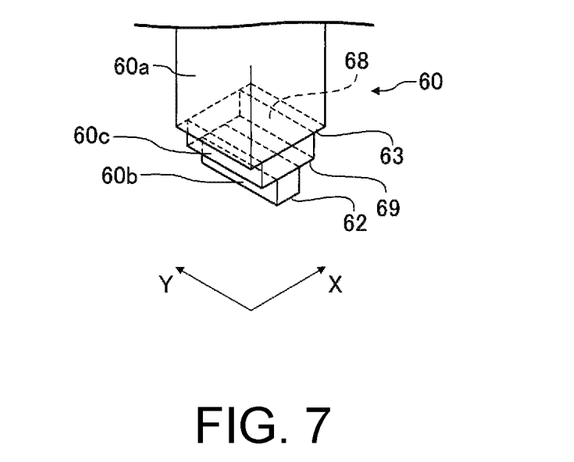
FIG. 7 illustrates the tip magnet piece, the intermediate magnet piece and the base magnet piece that have equal dimensions in the depth direction.
Figure 8:
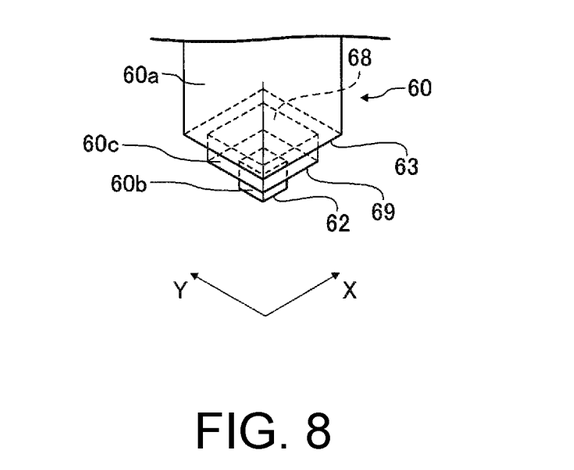
FIG. 8 illustrates the tip magnet piece and the intermediate magnet piece having smaller dimensions than the base magnet piece in the depth direction.

In the present embodiment, the magnetic-field forming magnet 60 is shaped to taper down. The magnetic-field forming magnet 60 may have any three-dimensional shape as long as a surface magnetic-flux density increases over the tip pole face 62. For example, the magnetic-field forming magnet 60 may be shaped as illustrated in FIG. 7 or FIG. 8. As illustrated in FIG. 7, if two intersecting directions in the tip pole face 62 are X direction (width direction) and Y direction (depth direction), the base magnet piece 60a, the intermediate magnet piece 60c, and the tip magnet piece 60b in FIG. 7 sequentially decrease in dimensions in X direction but are identical in dimensions in Y direction. In FIG. 8, the base magnet piece 60a, the intermediate magnet piece 60c, and the tip magnet piece 60b sequentially decrease in dimensions in X direction and Y direction. In other words, the intermediate magnet piece 60c has the face 68 (the upper side in FIG. 8) adjacent to the base magnet piece 60a such that the face 68 is smaller than the mounting face 63 of the base magnet piece 60a, and the intermediate magnet piece 60c has the face 69 (the lower side in FIG. 8) adjacent to the tip magnet piece 60b such that the face 69 is larger than the tip pole face 62. With respect to the face (mounting face 63) directed to the tip magnet piece 60b from the base magnet piece 60a, the mounting face 63 has larger dimensions in X direction (width direction) and Y direction (depth direction) than the tip pole face 62 in X direction and Y direction. In the shape of FIG. 8, the dimensions of the tip magnet piece 60b are quite smaller than those of the base magnet piece 60a and thus the tip pole face 62 has a higher surface magnetic-flux density than in the shape of FIG. 7. The magnet pieces are rectangular in cross section in the drawings. The shapes of the magnet pieces are not limited to rectangles and may be circular in cross section.

In the present embodiment, the canister 20 in FIG. 1 particularly serves as the test object 30 made of austenitic stainless steel. The test object 30 is not limited to the canister 20. The eddy current flaw detection device 40 can be used for flaw detection of all materials on which eddy current may occur.

The specific configuration of the detection part 54 of the eddy current flaw detection device 40 may be changed in various ways as long as a change of eddy current generated on the surface of the test object 30 can be detected. For example, uniform eddy current may be generated by a large exciting coil and a change of eddy current may be detected by a small detecting coil that is disposed below the exciting coil and has the central axis orthogonal to the exciting coil. Alternatively, two detecting coils may be disposed with an exciting coil interposed therebetween and a current difference between the two detecting coils may be measured as a detection signal. Additionally, a change of impedance may be measured to allow a single coil to act as both of an exciting coil and a detecting coil.

In the present embodiment, the base magnet piece 60a and the tip magnet piece 60b (and the intermediate magnet piece 60c) are fixed to each other with a magnetic force. This eliminates the need for another member for fixation. However, if it is necessary to prevent a misalignment between the base magnet piece 60a and the tip magnet piece 60b when the magnetic-field forming magnet 60 receives an external force, adhesive (e.g., two-pack type epoxy adhesive) suitable for bonding metals may be applied between the magnet pieces. In order to prevent a misalignment between the magnet pieces, a cover formed along the outside shape of the magnetic-field forming magnet 60 may be disposed over the magnetic-field forming magnet 60.

REFERENCE SIGNS LIST 10 concrete cask
20 canister
30 test object
40 eddy current flaw detection device
50 inspection probe
60 magnetic-field forming magnet
60a base magnet piece
60b tip magnet piece
62 tip pole face
64 base face

The invention claimed is:
1. An eddy current flaw detection device that generates eddy current on a test object and inspects a state of a surface of the test object by detecting a change of the eddy current, the eddy current flaw detection device comprising:
a detection part, comprising a coil, for detecting a change of the eddy current; and a magnetic-field forming magnet that is disposed outside the detection part and applies a magnetic field to the test object, wherein the magnetic-field forming magnet includes a first magnet piece and a second magnet piece more remote from the test object than the first magnet piece, and the first magnet piece has an end face near the test object such that the end face has a smaller area than at least one of end faces of the second magnet piece, the second magnet piece having one of the end faces near the test object and the other end face on an opposite side of the second magnet piece, the first magnet piece is composed of a first permanent magnet, the second magnet piece is composed of a second permanent magnet, wherein the first permanent magnet and the second permanent magnet are stacked in a first direction, and the first magnet piece and the second magnet piece are disposed on one side of the detection part.

2. The eddy current flaw detection device according to claim 1, wherein in a width direction, a width of the end face of the second magnet piece near the test object is larger than a width of the end face of the first magnet piece near the test object, in a length direction, a length of the end face of the second magnet piece near the test object is larger than a length of the end face of the first magnet piece near the test object, the width direction and the length direction are orthogonal to each other, and the width direction and the length direction are directions parallel with the end face of the first magnet piece near the test object.

3. The eddy current flaw detection device according to claim 1, wherein the test object is made of austenitic stainless steel, the test object has an outer surface including a welded part of austenitic stainless steel, and the eddy current flaw detection device generates eddy current on the welded part and inspects presence or absence of a flaw on the welded part by detecting a change of the eddy current.

4. The eddy current flaw detection device according to claim 1, wherein the end face of the first magnet piece near the test object and the end face of the second magnet piece near the test object are both north poles or are both south poles, and the other end face on an opposite side of the second magnet piece is a north pole or a south pole opposite to poles of the end face of the first magnet piece near the test object and the end face of the second magnet piece near the test object.

5. The eddy current flaw detection device according to claim 1, wherein the first magnet piece and the second magnet piece directly touch each other.

6. An eddy current flaw detection device that generates eddy current on a test object and inspects a state of a surface of the test object by detecting a change of the eddy current, the eddy current flaw detection device comprising:

a detection part, comprising a coil, for detecting a change of the eddy current; and a magnetic-field forming magnet that is disposed outside the detection part and applies a magnetic field to the test object, wherein the magnetic-field forming magnet includes a first magnet piece and a second magnet piece more remote from the test object than the first magnet piece, and the first magnet piece has an end face near the test object such that the end face has a smaller area than at least one of end faces of the second magnet piece, the second magnet piece having one of the end faces near the test object and the other end face on an opposite side of the second magnet piece, the first magnet piece is composed of a first permanent magnet, the second magnet piece is composed of a second permanent magnet, wherein the end face of the first magnet piece near the test object and the end face of the second magnet piece near the test object are both north poles or are both south poles, and the other end face on an opposite side of the second magnet piece is a north pole or a south pole opposite to poles of the end face of the first magnet piece near the test object and the end face of the second magnet piece near the test object.

\* \* \* \* \*